(12) United States Patent
Iida (10) Patent No.: US 8,365,608 B2  
(45) Date of Patent: Feb. 5, 2013

(54) TENSION DETECTION MECHANISM AND MANIPULATOR USING THE SAME

(75) Inventor: Masatoshi Iida, Hachioji (JP)

(73) Assignee: Olympus Corporation, Tokyo (JP)

( * ) Notice: Subject to any disclaimer, the term of this patent is extended or adjusted under 35 U.S.C. 154(b) by 391 days.

(21) Appl. No.: 12/726,790

(22) Filed: Mar. 18, 2010

(65) Prior Publication Data

US 2010/0236352 A1 Sep. 23, 2010

(30) Foreign Application Priority Data

Mar. 23, 2009 (JP) .................................. 2009-070737

(51) Int. Cl.
*G01B 5/30* (2006.01)
*G01N 3/08* (2006.01)

(52) U.S. Cl. .......................................... 73/760; 73/826

(58) Field of Classification Search .................... 73/760, 73/826, 831

See application file for complete search history.

(56) References Cited

U.S. PATENT DOCUMENTS

| 4,583,592 A * | 4/1986 | Gazda et al. ............. 166/250.07 |
| 5,094,103 A * | 3/1992 | Wicks et al. ................ 73/152.31 |
| 5,136,883 A * | 8/1992 | Jannotta .......................... 73/309 |
| 2007/0151391 A1 | 7/2007 | Larkin et al. |

FOREIGN PATENT DOCUMENTS

| JP | 3727937 | 10/2005 |
| JP | 2006-263849 | 10/2006 |

* cited by examiner

*Primary Examiner* — Max Noori
(74) *Attorney, Agent, or Firm* — Scully Scott Murphy & Presser, PC (57) ABSTRACT

A tension detection mechanism includes a linear member which extends in a longitudinal direction, and which is configured to transmits power, a restraining member including a restraining portion through which the linear member extends and which is configured to restrain movement of the linear member in the longitudinal direction partially, and a detection member which is provided to the restraining member and which is configured to detect tension of the linear member. A length of a portion of the linear member restrained by the restraining portion is larger than a distance between two ends of the restraining member in the longitudinal direction of the linear member.

14 Claims, 9 Drawing Sheets

TENSION DETECTION MECHANISM AND MANIPULATOR USING THE SAME

CROSS-REFERENCE TO RELATED APPLICATIONS

This application is based upon and claims the benefit of priority from prior Japanese Patent Application No. 2009-070737, filed Mar. 23, 2009, the entire contents of which are incorporated herein by reference.

BACKGROUND OF THE INVENTION

1. Field of the Invention

The present invention relates to a tension detection mechanism configured to detect the tension of a linear member such as a wire (the force of a joint portion) in a drive device which drives the joint portion by using the tension of the linear member, and a manipulator using the tension detection mechanism.

2. Description of the Related Art

When performing an abdominoscopic operation or pneumoscopic operation, an operator makes a small hole in the abdominal region of a patient and places a jig called a trocar in the hole in an inserted state. The operator then inserts a medical manipulator having a joint portion at the working portion of the distal end into the body of the patient through the insertion hole of the trocar, and performs an intraabdominal operation by operating the acting portion provided closer to the distal end than the joint portion. In general, since the diameter of the insertion hole of the trocar is 10 mm or less, the diameter of the tubular portion of a manipulator inserted through the trocar is required to be smaller than that of the trocar. As a manipulator having a tubular portion which is thin (a diameter of 10 mm or less) and long (a length of 300 mm or more), there is available a multi-degree-of-freedom manipulator typified by the da Vinci system available from Intuitive Surgical.

To meet the requirement to reduce the diameter of a tube portion, a linear member such as a wire is used as a power transmission member which transmits power from a motor as a joint portion drive mechanism to the joint. For example, a da Vinci system manipulator uses a linear member such as a wire having a small diameter of about 0.5 mm to place a power transmission member in a limited space inside a tube portion having a diameter of 10 mm or less.

Japanese Patent No. 3727937 and U.S. Patent Application Publication No. 2007/0151391 disclose medical manipulators. The working portion of such a manipulator is provided with a force detection mechanism configured to detect the force of a joint portion. The force detection mechanism includes a strain gauge as a detection member attached to the working portion. The strain gauge detects the force of the joint portion by detecting an external force acting on the working portion.

In addition, Jpn. Pat. Appln. KOKAI Publication No. 2006-263849 discloses a tension detection mechanism configured to detect the tension of a linear member. This tension detection mechanism has a load cell provided for one of a plurality of pulleys which guide the linear member. The load cell is used to detect the tension of the linear member.

BRIEF SUMMARY OF THE INVENTION

According to one aspect of the invention, there is provided a tension detection mechanism comprising: a linear member which extends in a longitudinal direction, and which is configured to transmits power; a restraining member including a restraining portion through which the linear member extends and which is configured to restrain movement of the linear member in the longitudinal direction partially; and a detection member which is provided to the restraining member and which is configured to detect tension of the linear member, wherein a length of a portion of the linear member restrained by the restraining portion is larger than a distance between two ends of the restraining member in the longitudinal direction of the linear member.

According to one other aspect of the invention, there is provided a manipulator comprising: a elongated tubular portion; a drive mechanism including a drive portion; a linear member which is extended in a longitudinal direction inside the tubular portion and has one end portion connected to the drive portion; a joint portion which is provided on a distal end side of the tubular portion, to which the other end portion of the linear member is connected, and which is configured to be driven by tension of the linear member; and a tension detection mechanism which comprises a restraining member including a restraining portion through which the linear member extends and which is configured to restrain movement of the linear member in the longitudinal direction partially, and a detection member which is provided to the restraining member and which is configured to detect the tension of the linear member, wherein a length of a part of the linear member restrained by the restraining portion is larger than a distance between two ends of the restraining member in the longitudinal direction of the linear member.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and detailed description of the embodiments given below, serve to explain the principles of the invention.

DETAILED DESCRIPTION OF THE INVENTION

Figure 1:
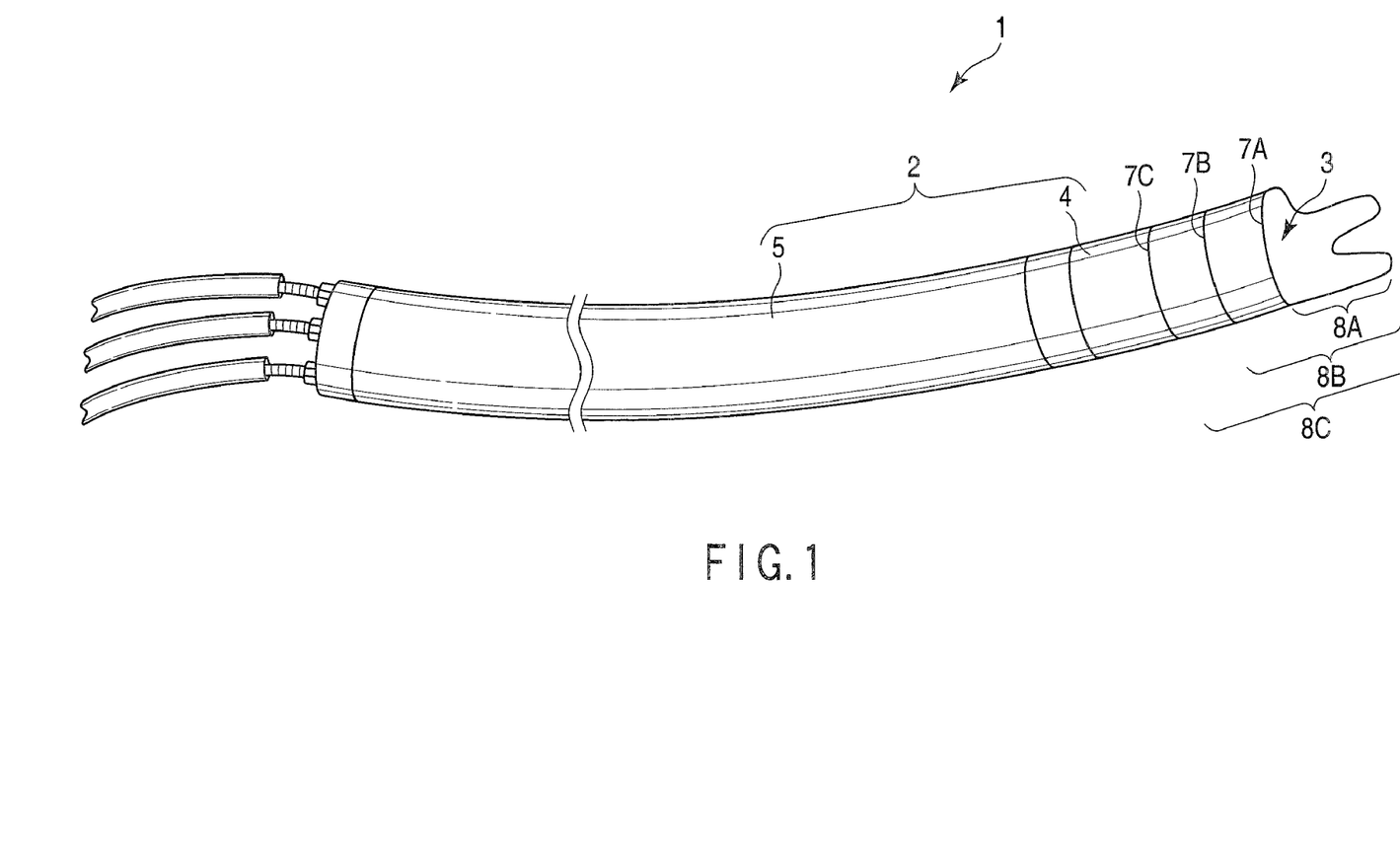
FIG. 1 is a schematic view showing the structure of a manipulator including a drive device according to the first embodiment of the present invention.

The first embodiment of the present invention will be described with reference to FIGS. 1 to 12. FIG. 1 is a view showing a medical manipulator 1 including tension detection mechanism 13 of this embodiment. In this case, the manipulator 1 is a soft or semi-soft manipulator. As shown in FIG. 1, the manipulator 1 includes an elongated tubular portion 2 and a working portion 3 provided on the distal end side of the tubular portion 2.

The tubular portion 2 has a diameter of 15 mm or less (preferably about 10 mm). The tubular portion 2 includes a hard portion 4 provided on the proximal end side of the working portion 3 and a flexible portion 5 having flexibility which is provided on the proximal end side of the hard portion 4. The flexible portion 5 is formed from a member having flexibility such as a resin member embedded with a thin metal wire. The length of the flexible portion 5 in the longitudinal direction is about 300 mm, which is extremely larger than that of the hard portion 4 in the longitudinal direction.

The working portion 3 of the manipulator 1 has three degrees of freedom, and is sequentially provided, from the distal end side, with three joint portions, i.e., a gripping joint portion 7A, a rotating joint portion 7B, and a bending joint portion 7C which are respectively used for gripping, rotating, and bending actions. The distal end side portions of the joint portions 7A, 7B, and 7C respectively serve as a gripping action portion 8A, a rotating action portion 8B, and a bending action portion 8C which respectively perform gripping, rotating, and bending actions. A drive device 10 of the manipulator 1 includes a griping drive device 10A, a rotating drive device (not shown), and a bending drive device (not shown).

Figure 2:
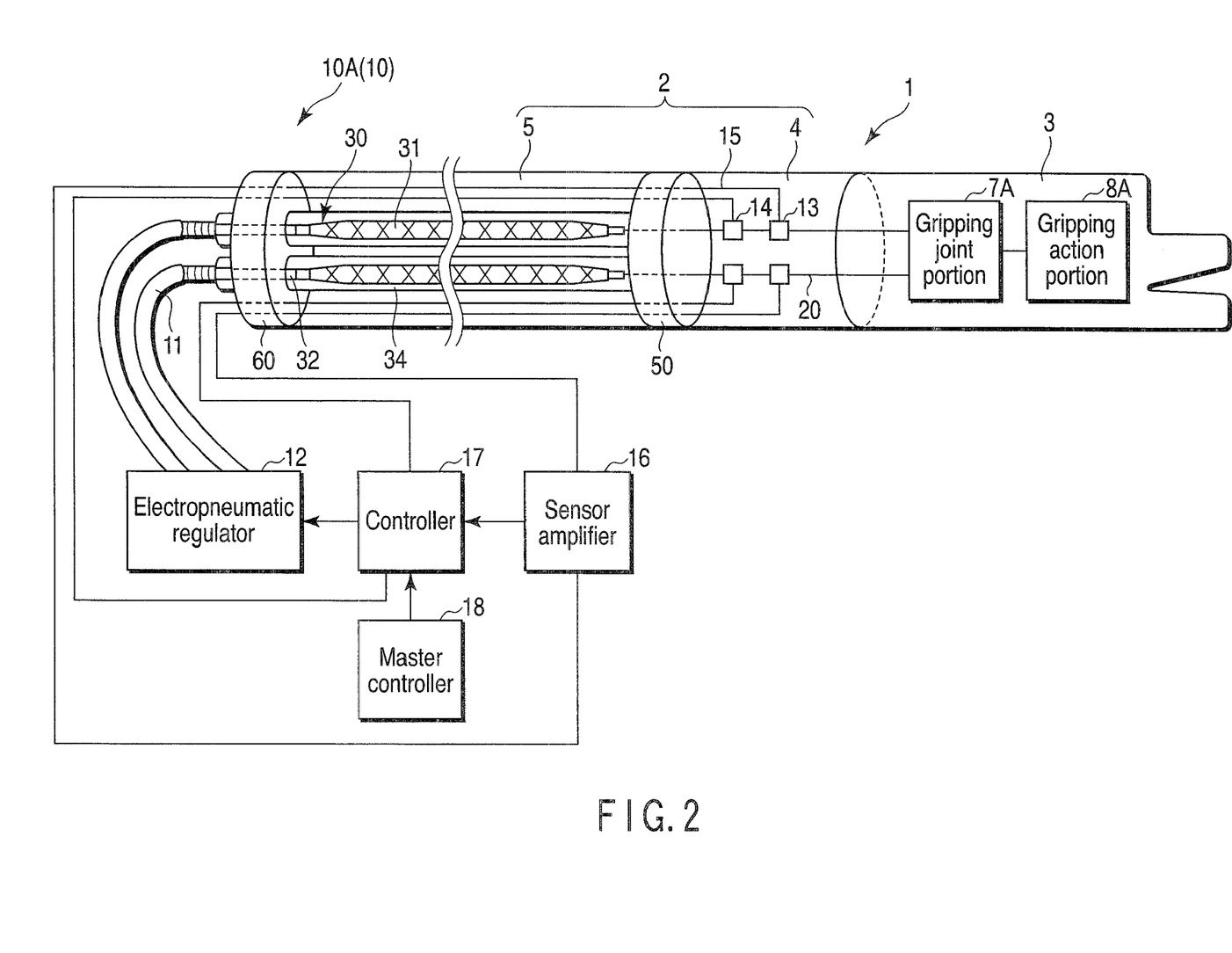
FIG. 2 is a schematic view showing the structure of a gripping drive device according to the first embodiment.

FIG. 2 is a view showing the griping drive device 10A which performs gripping action with the gripping action portion 8A. As shown in FIG. 2, the griping drive device 10A includes the gripping action portion 8A for performing gripping action and the gripping joint portion 7A connected to the gripping action portion 8A. Two wires 20 as linear members provided inside the hard portion 4 are connected to the gripping joint portion 7A. The proximal end portions of the wires 20 are connected to actuators 30 as drive mechanisms provided inside the flexible portion 5. The actuators 30 include actuator portions 31 as drive portions. The proximal end portions of the actuator portions 31 are connected to an electropneumatic regulator 12 as an air pressure source provided outside the manipulator 1 through tubes 11 having flexibility such as urethane tubes.

The electropneumatic regulator 12 supplies pressurized air to the actuator portions 31 or pressurized air is discharged from the actuator portions 31 to adjust the internal pressures of the actuator portions 31. Adjusting the pressures of the actuator portions 31 will push the wires 20 connected to the actuators 30 to the distal end side or pull the wires 20 to the proximal end side, thus moving the wires 20 in the longitudinal direction. As the wires 20 move in the longitudinal direction, the gripping joint portion 7A is driven to make the gripping action portion 8A perform gripping action, as will be described later.

The tension detection mechanisms 13 and position detection mechanisms 14 such as position sensors are provided near the connecting portions at which the wires 20 are connected to the gripping joint portion 7A. The tension detection mechanisms 13 detect the tensions of the wires 20. The position detection mechanisms 14 detect the moving amounts of the wires 20 in the longitudinal direction. The tension detection mechanisms 13 are connected to a sensor amplifier 16 such as a strain amplifier via signal lines 15. A controller 17 as a control mechanism receives the tension information of each wire 20 from the sensor amplifier 16. The controller 17 also receives the position information of each wire 20 via the position detection mechanism 14. Operating a master controller 18 as an operation mechanism based on the tension information and position information input to the controller 17 will cause the controller 17 to send pressure adjustment commands of the actuator portions 31 to the electropneumatic regulator 12. Based on the air pressure adjustment commands, the electropneumatic regulator 12 adjusts the pressures of the actuator portions 31, thereby adjusting the tensions of the wires 20 and their moving amounts in the longitudinal direction.

Note that the rotating drive device and the bending drive device which respectively make the rotating action portion 8B and the bending action portion 8C perform rotating and bending action have the same structure as that of the griping drive device 10A. The two wires 20 are therefore connected to each of the joint portions 7A, 7B, and 7C. That is, the six wires 20 are provided inside the hard portion 4 of the tubular portion 2. In addition, since the actuators 30 are connected to the proximal end portions of the respective wires 20, the six actuators 30 are provided inside the flexible portion 5 of the tubular portion 2.

Figure 3:
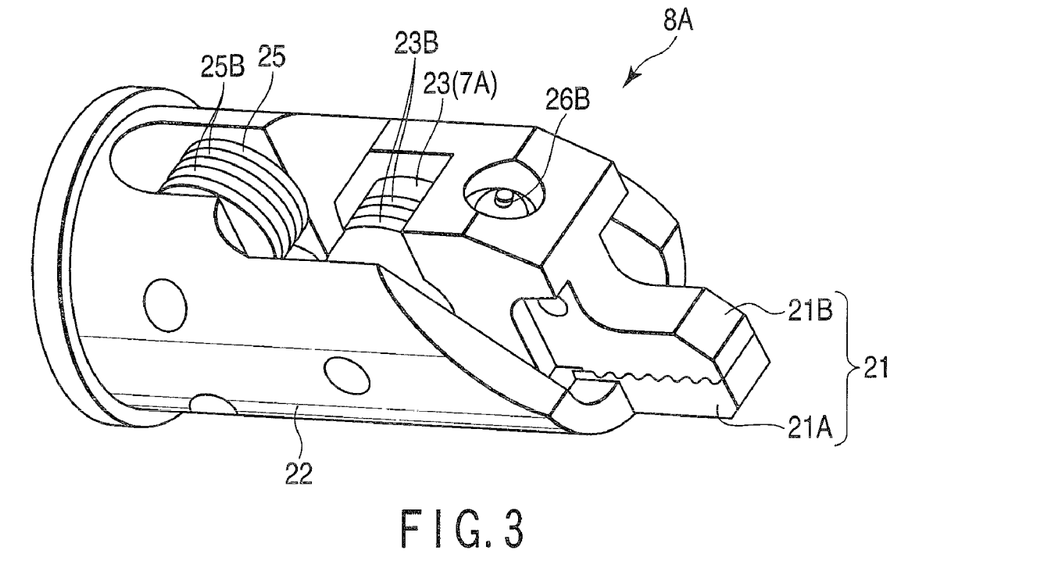
FIG. 3 is a perspective view showing the structure of a gripping joint portion and gripping acting portion according to the first embodiment.
Figure 4:
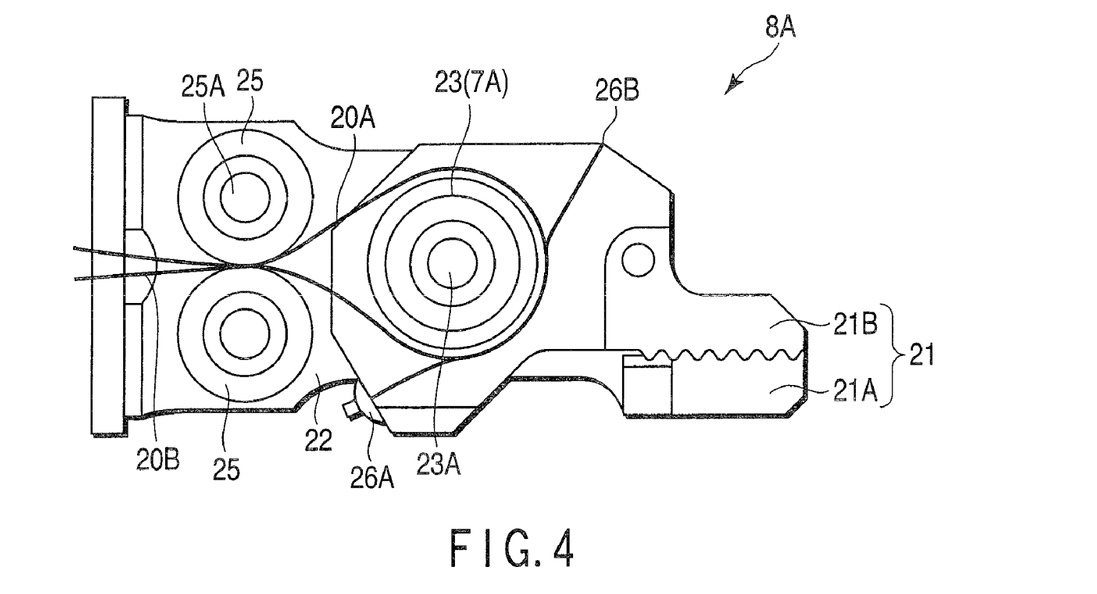
FIG. 4 is a schematic view showing the internal structure of the gripping joint portion and gripping acting portion according to the first embodiment.
Figure 5:
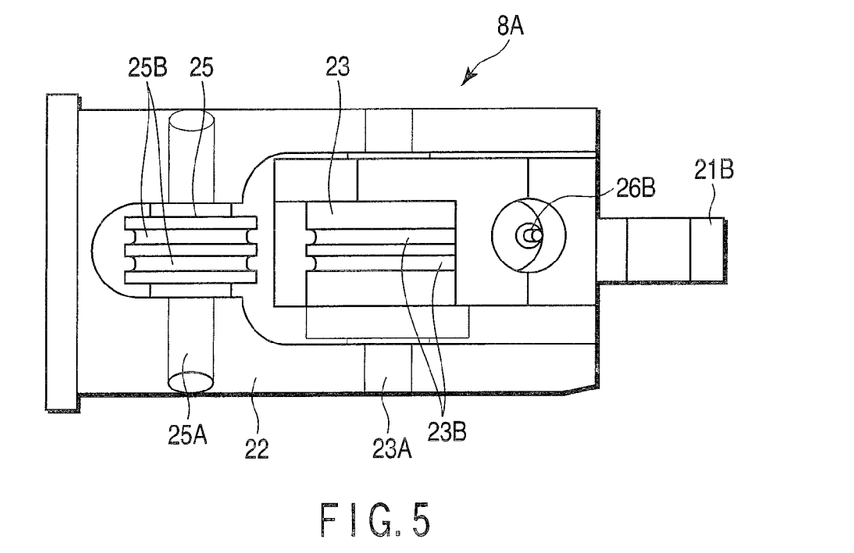
FIG. 5 is a plan view showing the structure of the gripping joint portion and gripping acting portion according to the first embodiment.

FIGS. 3 to 5 are views showing the structure of the gripping joint portion 7A and gripping action portion 8A. As shown in FIGS. 3 to 5, the gripping action portion 8A includes a pair of grip portions 21 and a housing 22 to which a first grip portion 21A, which is one of the pair of grip portions 21, is fixed. The distal end portion of the housing 22 holds a second grip portion 21B, which is the other of the grip portions 21, so as to allow it to open/close with respect to the first grip portion 21A. The proximal end portion of the second grip portion 21B is provided with a pulley 23, which is the gripping joint portion 7A, integrally with the second grip portion 21B. The pulley 23 has a rotating shaft 23A in the center. The pulley 23 is mounted on the housing 22 so as to be rotatable about the rotating shaft 23A. Two grooves 23B are formed in the outer surface of the pulley 23 along the circumferential direction of the pulley 23 so as to be juxtaposed in the axial direction of the pulley 23. One wire 20 is connected to each of the grooves 23B.

Two guide pulleys 25 which guide the wires 20 to the tubular portion 2 are provided on the proximal end side of the pulley 23 so as to be vertically juxtaposed. Like the pulley 23, each guide pulley 25 has a rotating shaft 25A in the center. Each guide pulley 25 is mounted on the housing 22 so as to be rotatable about the rotating shaft 25A. Like the pulley 23, each guide pulley 25 has two grooves 25B formed in the outer surface along the circumferential direction of the guide pulley 25 so as to be juxtaposed in the axial direction of the guide pulley 25. Each groove 25B guides one wire 20.

A first wire 20A which is one of the two wires 20 connected to the pulley 23 is guided, by the guide pulleys 25, from the tubular portion 2 to extend through almost the center of the housing 22 which is located between the two guide pulleys 25, and is wound around the one groove 23B of the pulley 23 from the upper side. The first wire 20A is then fixed to a first stop portion 26A provided on the outer wall of the lower portion of the proximal end portion of the first grip portion 21A in FIG. 4. With this structure, the first wire 20A is connected to the pulley 23. Likewise, a second wire 20B which is the other wire 20 is guided, by the guide pulleys 25, from the tubular portion 2 to extend through almost the center of the housing 22 which is located between the two guide pulleys 25, and is wound around the other groove 23B of the pulley 23 from the lower side. The second wire 20B is then fixed to a second stop portion 26B provided on the outer wall of the upper portion of the proximal end portion of the second grip portion 21B in FIG. 4. With this structure, the second wire 20B is connected to the pulley 23.

With this structure, the pulley 23 rotates in one direction as the first wire 20A, which is one of the two antagonistically arranged wires 20, is pulled to the proximal end side, and the second wire 20B, which is the other of the two wires 20, is pushed to the distal end side. When the two wires 20 connected to the pulley 23 move antiparallel in the longitudinal direction, the pulley 23 is driven by the tensions of the wires 20. As the pulley 23 rotates in one direction, the second grip portion 21B opens/closes with respect to the first grip portion 21A, thus making the gripping action portion 8A perform gripping action.

Guiding the wires 20 through almost the center of the housing 22 by using the guide pulleys 25 prevents the wires 20 from being influenced by rotating and bending actions.

Note that the rotating action portion 8B and the bending action portion 8C have almost the same structure as that of the gripping action portion 8A, and the two antagonistically arranged wires 20 move antiparallel in the longitudinal direction to drive the pulley 23 which constitutes the rotating joint portion 7B or bending joint portion 7C. This makes the rotating action portion 8B and the bending action portion 8C perform rotating and bending actions.

Figure 8:
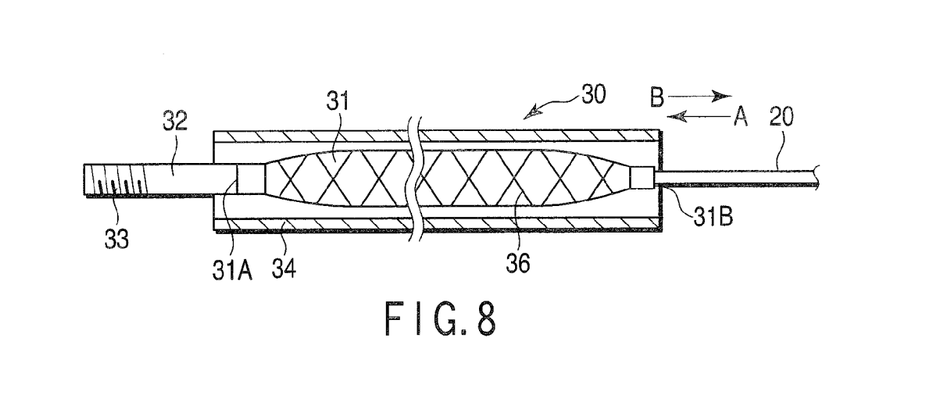
FIG. 8 is a sectional view showing the structure of an actuator according to the first embodiment.

FIG. 8 is a view showing the structure of the actuator 30 connected to the proximal end portion of the wire 20. As shown in FIG. 8, the actuator 30 includes the actuator portion 31 which is a tubular drive portion having a small diameter. The actuator portion 31 is formed from a member having flexibility such as a resin member in which a small-diameter member 36 which is not easily extendible is embedded in a meshed pattern. The actuator portion 31 is formed to have a diameter of about 1.5 mm and a length of about 300 mm in accordance with the flexible portion 5 having a diameter of about 10 mm and a length of about 300 mm. With this structure, the six actuators 30 are housed in the flexible portion 5. A distal end face 31B of the actuator portion 31 is closed. The proximal end portion of the wire 20 is connected to the distal end face 31B.

A pipe 32 as a fluid supply/discharge portion which supplies pressurized air into the actuator portion 31 and discharges pressurized air from it is provided on the proximal end side of the actuator portion 31 integrally with the actuator portion 31. The proximal end portion of the pipe 32 is connected to the electropneumatic regulator 12 through the tube 11 described above. A male thread portion 33 is formed on the outer surface of the proximal end portion of the pipe 32 so as to have a desired length in the longitudinal direction. Each actuator portion 31 is housed in a metal tubular member 34 having flexibility such as a SUS pipe or coil pipe having a thin wall throughout almost the total length in the longitudinal direction.

As shown in FIG. 2, a distal end side wall portion 50 as a distal end side support member and a proximal end side wall portion 60 as a proximal end side support member, each having a desired thickness, are provided on the distal end side and proximal end side of the flexible portion 5 of the tubular portion 2 respectively so as to close the inside of the tubular portion 2 in a direction perpendicular to the longitudinal direction. The distal end side wall portion 50 and the proximal end side wall portion 60 support the tubular members 34. The proximal end side wall portion 60 supports the actuator portions 31 and the pipes 32.

Figure 9:
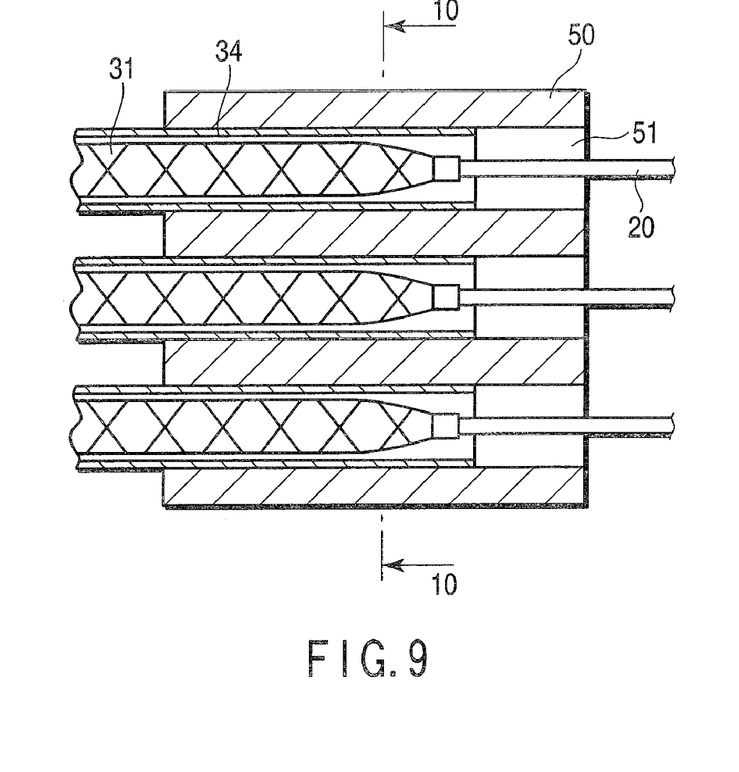
FIG. 9 is a sectional view showing the structure of a distal end side wall portion according to the first embodiment.
Figure 10:
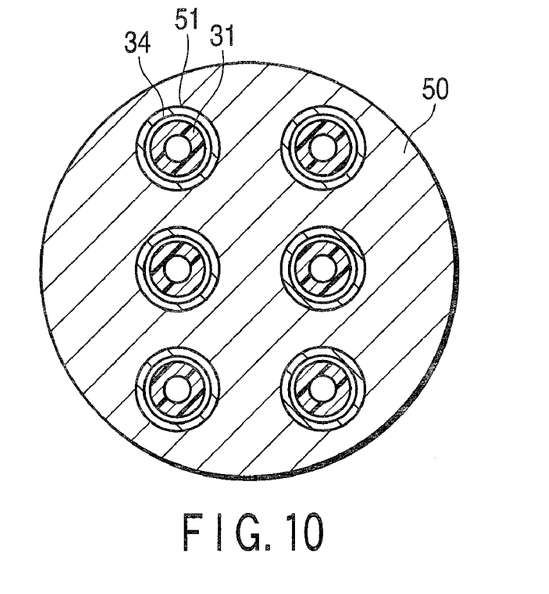
FIG. 10 is a sectional view taken along a line 10-10 in FIG. 9.

FIGS. 9 and 10 are views showing the structure of the distal end side wall portion 50. As shown in FIGS. 9 and 10, the distal end side wall portion 50 is provided with six distal end side through holes 51 as distal end side tubular member support portions extending through the distal end side wall portion 50 in the longitudinal direction. The six distal end side through holes 51 each have almost the same diameter as that of the tubular member 34, and are formed in threes in a symmetrical pattern at predetermined intervals in the vertical direction. The distal end portion of one tubular member 34 is inserted in each distal end side through hole 51 and is fixed by contact bonding, soldering, using an adhesive, or the like. With this structure, the distal end portion of the tubular member 34 is supported on the distal end side wall portion 50 in a fixed state, and the movement of the tubular member 34 in the direction toward the distal end is restricted.

Figure 11:
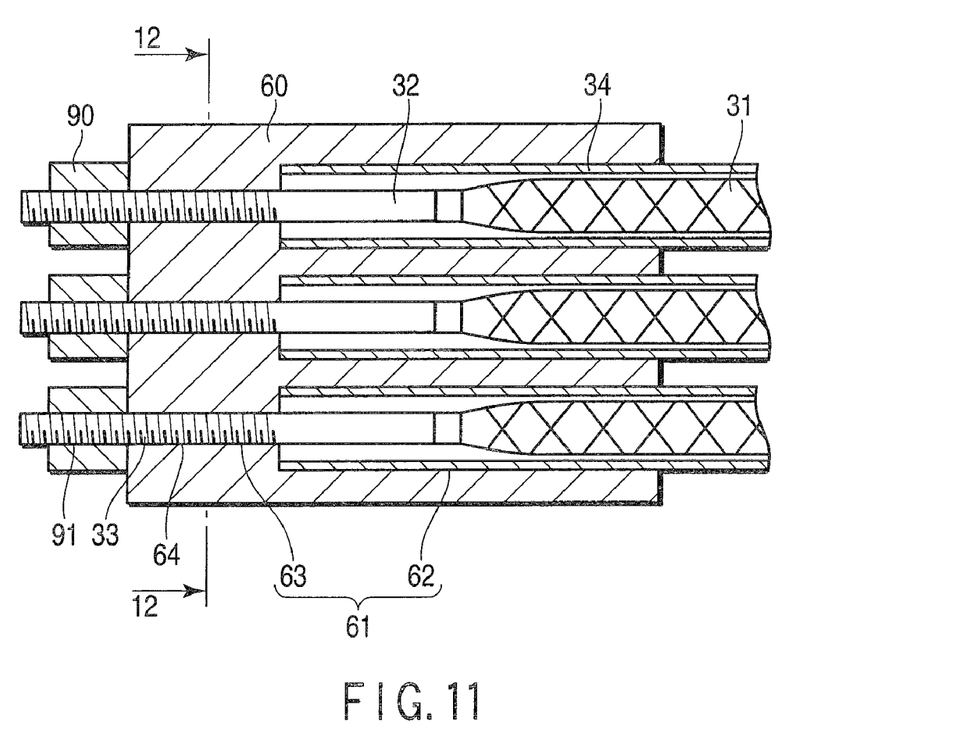
FIG. 11 is a sectional view showing the structure of a proximal end side wall portion according to the first embodiment.
Figure 12:
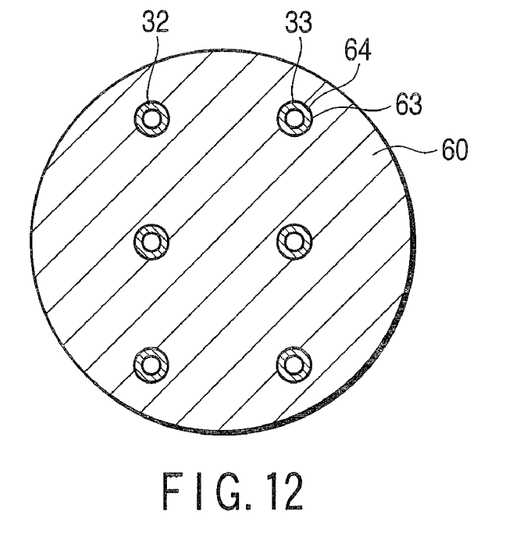
FIG. 12 is a sectional view taken alone a line 12-12 in FIG. 11.

FIGS. 11 and 12 are views showing the structure of the proximal end side wall portion 60. As shown in FIGS. 11 and 12, like the distal end side wall portion 50, the proximal end side wall portion 60 is provided with six proximal end side through holes 61 extending through the proximal end side wall portion 60 in the longitudinal direction, which are arranged in threes in a symmetrical pattern at predetermined intervals in the vertical direction. Each proximal end side through hole 61 includes a tubular member hole 62 as a proximal end side tubular member support portion provided on the distal end side of the proximal end side through hole 61 and a drive portion hole 63 provided on the proximal end side of the proximal end side through hole 61.

The tubular member hole 62 as a proximal end side tubular member support portion has almost the same diameter as that of the tubular member 34. The proximal end portion of one tubular member 34 is inserted in each tubular member hole 62 and is fixed by contact bonding, soldering, using an adhesive, or the like. With this structure, the proximal end portion of the tubular member 34 is supported on the proximal end side wall portion 60 in a fixed state, and the movement of the tubular member 34 in the direction toward the proximal end is restricted.

A female thread portion 64 is provided on a surface of the proximal end side wall portion 60 which is in contact with each drive portion hole 63 so as to have a desired length in the longitudinal direction. The length of each female thread portion 64 in the longitudinal direction is smaller than that of a male thread portion 33 of each pipe 32. Part of the male thread portion 33 of the pipe 32 formed integrally with the actuator portion 31 threadably engages with the female thread portion 64 of the proximal end side wall portion 60 to support the actuator portions 31 and the pipe 32 on the proximal end side wall portion 60 in a fixed state. That is, the female thread portion 64 of the proximal end side wall portion 60 serves as a drive portion support portion which threadably engages with part of the male thread portion 33 of the pipe 32 serving as a drive portion supported portion. This restricts the movement of the actuator portions 31 and pipe 32 in the direction toward the proximal end.

This structure restricts the movement of the actuator portions 31 toward the proximal end side and the movement of the tubular member 34 toward the distal end side and the proximal end side. Each actuator portion 31 therefore serves as a so-called fluid pressure artificial muscle which is extendible in the longitudinal direction, in accordance with a change in internal pressure, inside the tubular member 34 in which the actuator portion 31 is fixed with a proximal end face 31A serving as a fixed end and a distal end face 31B serving as a free end. That is, when the electropneumatic regulator 12 supplies pressurized air to the actuator portion 31, the actuator portion 31 expands in the radial direction and shrinks toward the proximal end side in the longitudinal direction while the proximal end face 31A is fixed. As a consequence, the wire 20 connected to the distal end face 31B of the actuator portion 31 is pulled in the direction toward the proximal end (an arrow A in FIG. 8). In contrast, when pressurized air is discharged from the actuator portion 31, the actuator portion 31 shrinks in the radial direction and expands toward the distal end side in the longitudinal direction. As a consequence, the wire 20 connected to the distal end face 31B of the actuator portion 31 is pushed in the direction toward the distal end (an arrow B in FIG. 8). When the two antagonistically arranged wires 20 are moved antiparallel in the longitudinal direction by adjusting the internal pressures of the actuator portions 31, the pulley 23 is driven by the tensions of the wires 20, as described above. That is, the actuator portions 31 of the actuators 30 connected to the proximal end portions of the wires 20 drive/control the pulley 23 which constitutes the joint portion 7A, 7B, or 7C.

In addition, the actuator portions 31 are housed in the flexible tubular members 34 whose distal and proximal ends are fixed. Therefore, when the flexible portion 5 bends, the actuator portions 31 can deflect together with the tubular members 34 inside the flexible portion 5.

Furthermore, since the actuator portions 31 are reliably supported on the proximal end side wall portion 60, setting internal pressures of about 0.1 to 0.6 MPa in the actuator portions 31 can implement a force of about 10N to 20N and a displacement of about 10 mm to 20 mm which are necessary for the manipulator 1. In this case, the force and displacement of the manipulator 1 are changed by adjusting parameters such as the screen angle of the small-diameter member 36 and the diameter of the actuator portions 31.

Note that the structures of the distal end side tubular member support portion, proximal end side tubular member support portion, and drive portion support portion are not limited to the above structures. For example, it is possible to use a structure in which screw holes are formed in the distal end side wall portion 50 so as to extend from the outer surface to the distal end side through holes 51, and the tubular members 34 are fixed to the distal end side wall portion 50 by making screws extend through the screw holes. This also applies to the proximal end side tubular member support portions and the drive portion support portions. In addition, the tubular member holes 62 as the proximal end side tubular member support portions and the female thread portions 64 as the drive portion support portions are integrally formed with the proximal end side wall portion 60 as the same member. However, they may be formed in different members.

Figure 6:
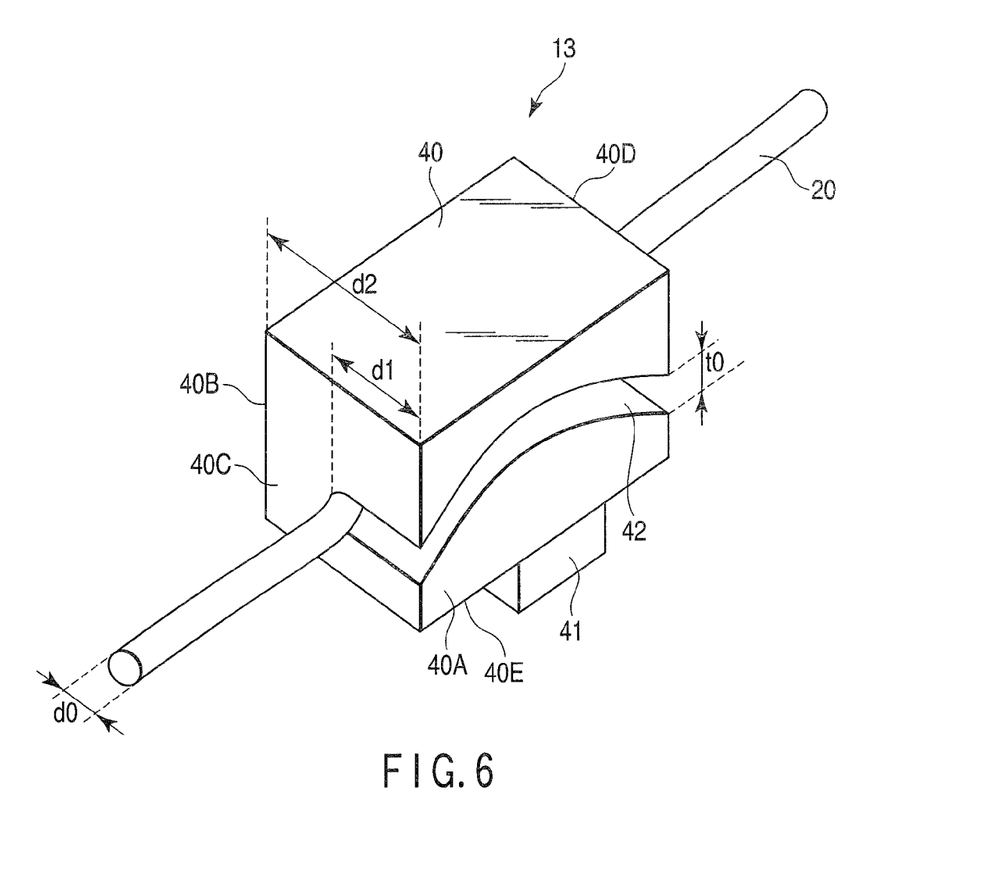
FIG. 6 is a perspective view showing the structure of a tension detection mechanism according to the first embodiment.
Figure 7A:
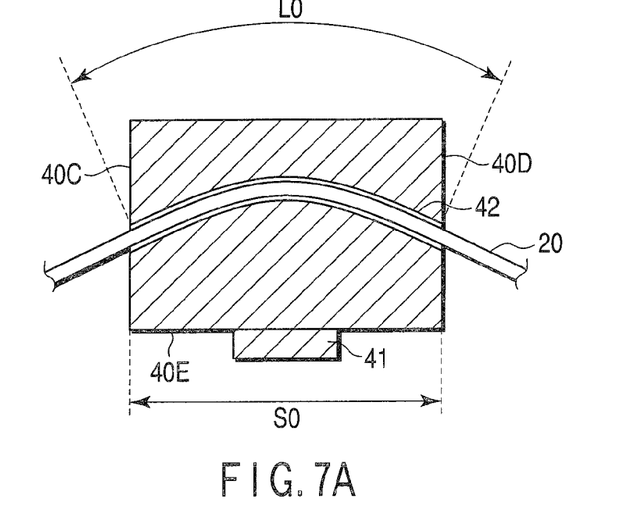
FIG. 7A is a sectional view showing the structure of the tension detection mechanism according to the first embodiment.

FIGS. 6 and 7A are views showing the structure of the tension detection mechanism 13 provided for each of the six wires 20 connected, in twos, to the joint portions 7A, 7B, and 7C. As shown in FIGS. 6 and 7A, the tension detection mechanism 13 includes a rectangular parallelepiped restraining member 40 which restrains the wire 20 partially and a strain gauge 41 as a detection member mounted on the restraining member 40. The restraining member 40 is formed from a material such as Duracon, a metal, or a resin. In this case, one of the four side surfaces of the restraining member 40 which are parallel to the longitudinal direction is defined as a first surface 40A, and the surface parallel to the first surface 40A is defined as a second surface 40B. The two surfaces of the restraining member 40 which are perpendicular to the longitudinal direction are respectively defined as a third surface 40C and a fourth surface 40D. One of the two side surfaces of the restraining member 40 which are parallel to the longitudinal direction and perpendicular to the first and second surfaces 40A and 40B is defined as a fifth surface 40E. Note that the wire 20 and the restraining member 40 are shown in FIG. 7A, with a gap between them, in order that the illustrations of the wire 20 and a restraining portion of the retraining member 40 can be easily understood. However, there is almost no gap between the wire 20 and the retraining member 40 in an actual embodiment.

An arcuated groove 42 as a restraining portion is formed in the first surface 40A of the restraining member 40 throughout the total length of the first surface 40A in the longitudinal direction (from the third surface 40C to the fourth surface 40D). The wire 20 extends through the groove 42, and the groove 42 restrains the movement of the wire 20 in the longitudinal direction partially. As shown in FIG. 6, a width t0 of the groove 42 of the restraining member 40 is smaller than a diameter d0 of a portion of the wire 20 which is not restrained by the restraining member 40. With this structure, inserting the wire 20 into the groove 42 allows the groove 42 as a restraining portion to restrain the wire 20. A depth d1 of the groove 42 is almost half a distance d2 from the first surface 40A of the restraining member 40 to the second surface 40B parallel to the first surface 40A.

In a cross-section taken parallel to the first surface 40A, the groove 42 as a restraining portion is formed in an arcuated shape which is a nonlinear shape deviating from a straight line connecting the third surface 40C and the fourth surface 40D (the two ends of the restraining member 40 in the longitudinal direction). For this reason, as shown in FIG. 7A, a length L0 of a portion of the wire 20 restrained by the groove 42 as a restraining portion is larger than a distance S0 between the third surface 40C and fourth surface 40D of the restraining member 40. That is, the length L0 of the portion of the wire 20 restrained by the groove 42 as a restraining portion is larger than the distance S0 between the two ends of the restraining member 40 in the longitudinal direction.

The strain gauge 41 is mounted on the fifth surface 40E of the restraining member 40 which is parallel to the longitudinal direction and perpendicular to the first surface 40A. The strain gauges 41 are connected to the sensor amplifier 16 via the signal lines 15 (see FIG. 2).

With this structure, since the length L0 of the portion of the wire 20 restrained by the groove 42 as a restraining portion is larger than the distance S0 between the third surface 40C and the fourth surface 40D, the tension produced in the wire 20 acts on the restraining member 40. As a result, the restraining member 40 is deformed and strained in a direction perpendicular to the fifth surface 40E of the restraining member 40 on which the strain gauge 41 is mounted. The strain gauge 41 detects this strain amount to detect the tension of the wire 20, i.e., the force of the pulley 23.

Note that the groove 42 as a restraining portion is formed in an arcuated shape in a cross-section taken parallel to the first surface 40A. However, the present invention is not limited to this. For example, the groove 42 may be formed in a zigzag form in a cross-section taken parallel to the first surface 40A as long as the length L0 of a portion of the wire 20 restrained by the groove 42 as a restraining portion is larger than the distance S0 between the third surface 40C and the fourth surface 40D as the two ends of the restraining member 40 in the longitudinal direction.

Figure 7B:
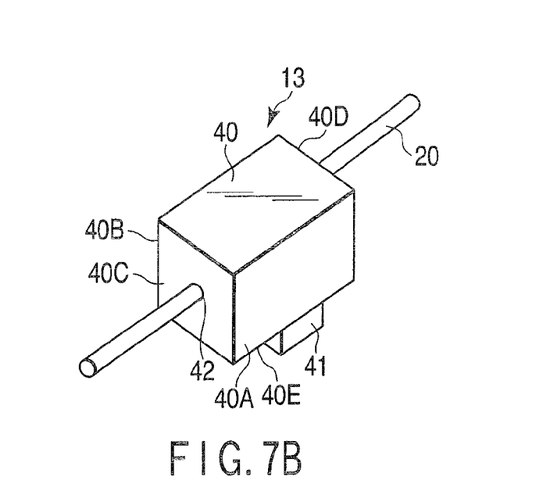
FIG. 7B is a perspective view showing a case in which the restraining portion of the tension detection mechanism according to the first embodiment is a hole.

Although the wire 20 is restrained by the groove 42 as a restraining portion, the wire 20 may be restrained by a hole extending through the third surface 40C and the fourth surface 40D as the two ends of the restraining member in the longitudinal direction, as shown in FIG. 7B. In this case, the hole is formed in a nonlinear shape (e.g., an arcuated shape) deviating from a straight line connecting the third surface 40C and the fourth surface 40D, and the movement of the wire 20 in the longitudinal direction is restrained partially when it extends through the hole.

The operations of the tension detection mechanisms 13 and the manipulator 1 using them according to this embodiment will be described next.

In the manipulator 1 according to this embodiment, when part of the male thread portion 33 of each pipe 32 as a fluid supply/discharge portion formed integrally with the actuator portion 31 as a drive portion threadably engages with the female thread portion 64 of the proximal end side wall portion 60, the actuator portion 31 and the pipe 32 are supported on the proximal end side wall portion 60 in a fixed state. That is, each pipe 32 as a fluid supply/discharge portion serves as a drive portion supported portion. This restricts the movement of the actuator portions 31 and pipes 32 in the direction toward the proximal end.

Each actuator portion 31 serves as a so-called fluid pressure artificial muscle which is extendible in the longitudinal direction, in accordance with a change in internal pressure, inside the tubular member 34 in which the actuator portions 31 is fixed with the proximal end face 31A serving as a fixed end and the distal end face 31B serving as a free end. That is, when the electropneumatic regulator 12 supplies pressurized air to the actuator portion 31 through the pipe 32, the actuator portion 31 expands in the radial direction and shrinks toward the proximal end side in the longitudinal direction while the proximal end face 31A is fixed. As a consequence, the wire 20 connected to the distal end face 31B of the actuator portion 31 is pulled in the direction toward the proximal end (the arrow A in FIG. 8). In contrast, when pressurized air discharged from the actuator portion 31, the actuator portion 31 shrinks in the radial direction and expands toward the distal end side in the longitudinal direction. As a consequence, the wire 20 connected to the distal end face 31B of the actuator portion 31 is pushed in the direction toward the distal end (the arrow B in FIG. 8). When the two antagonistically arranged wires 20 are moved antiparallel in the longitudinal direction by adjusting the internal pressures of the actuator portions 31, the pulley 23 is driven by the tensions of the wires 20. That is, the actuator portions 31 of the actuators 30 connected to the proximal end portions of the wires 20 drive/control the pulley 23 which constitutes the joint portion 7A, 7B, or 7C.

In addition, as described above, in the manipulator 1, the pulley 23 which constitutes the joint portion 7A, 7B, or 7C is driven by the tensions of the wires 20 to rotate in one direction. In this case, since the length L0 of the portion of each wire 20 restrained by the groove 42 as a restraining portion becomes larger than the distance S0 between the two ends of the restraining member 40 of each tension detection mechanism 13 in the longitudinal direction, the tension produced in the wire 20 acts on the restraining member 40. As a result, the restraining member 40 is deformed and strained in a direction perpendicular to the fifth surface 40E of the restraining member 40 on which the strain gauge 41 is mounted. The strain gauge 41 detects this strain amount to detect the tension of the wire 20, i.e., the force of the pulley 23.

In addition, in the tension detection mechanism 13, the strain gauge 41 is mounted on the fifth surface 40E which is parallel to the longitudinal direction and perpendicular to the first surface 40A. That is, the strain gauge 41 is placed on the fifth surface 40E which is a surface perpendicular to the strain direction of the restraining member 40. This makes it possible to detect the tensions of the wires 20 more accurately. Note that the strain gauge (i.e., a detection member) 41 need not be provided on the fifth surface 40E; it may be provided on a surface opposed to the fifth surface 40E, i.e., on a surface perpendicular to the strain direction of the restraining member 40. In addition, a strain gauge 41 may be provided on both the fifth surface 40E and the surface opposed to the fifth surface 40E, though the electric connection may be somewhat complex in this case. The strain gauge 41 is provided on both the fifth surface 40E and the surface opposed to the fifth surface 40E, thereby temperature compensation and higher accuracy of detection can be performed.

The tension detection mechanisms 13 having the above structure and the manipulator 1 using them have the following effects. That is, in the manipulator 1 according to this embodiment, the wires 20 as linear members are restrained by the grooves 42 as restraining portions of the restraining members 40 of the tension detection mechanisms 13 partially. In this case, since the length L0 of the portion of each wire 20 restrained by the groove 42 as a restraining portion becomes larger than the distance S0 between the two ends of each restraining member 40 in the longitudinal direction, the tension produced in the wire 20 acts on the restraining member 40 to strain it. The strain gauge 41 detects this strain amount to detect the tension of the wire 20. Since there is no need to provide any pulleys for the detection of the tensions of the wires 20 as in the prior art, the miniaturization of the tension detection mechanisms 13 can be implemented. This makes it possible to house the tension detection mechanisms 13 in the small-diameter tube of the manipulator 1.

In each tension detection mechanism 13, the groove 42 as a restraining portion is formed in the first surface 40A, which is one of the four surfaces of the restraining member 40 which are parallel to the longitudinal direction, throughout the total length of the first surface 40A in the longitudinal direction. Since the groove 42 is formed in the first surface 40A parallel to the wire 20, the wire 20 can be easily restrained by the groove 42 as a restraining portion of the restraining member 40.

In addition, in each tension detection mechanism 13, the groove 42 as a restraining portion is formed in an arcuated shape in a cross-section taken parallel to the first surface 40A. This makes it possible to form the groove 42 as a restraining portion by a simple process and hence to implement a reduction in cost.

In each tension detection mechanism 13, the strain gauge 41 is mounted on the fifth surface 40E which is parallel to the longitudinal direction and perpendicular to the first surface 40A in which the groove 42 is formed. That is, the strain gauge 41 is mounted on the fifth surface 40E which is a surface perpendicular to the strain direction of the restraining member 40. This makes it possible to detect the tension of the wire 20 more accurately.

In the manipulator 1, the tension detection mechanisms 13 are mounted on the wires 20 as linear members. This makes it possible to detect the tensions of the wires 20 even if the manipulator 1 is a soft or semi-soft manipulator having the flexible portion 5 which is long in the longitudinal direction.

Furthermore, in the manipulator 1, the tension detection mechanisms 13 are provided near the connecting portions at which the wires 20 are connected to the pulley 23 as a joint portion. For this reason, even if the flexible portion 5 bends, it is possible to detect the tensions of the wires 20 near the pulley 23. This can accurately detect the power of the pulley 23 and improve the contrability of the pulley 23.

The first modification of the first embodiment of the present invention will be described next with reference to FIG. 13. In the first modification, the structure of the first embodiment is modified in the following manner. Note that the same reference numerals as in the first embodiment denote the same parts in the first modification, and a repetitive description will be omitted.

Figure 13:
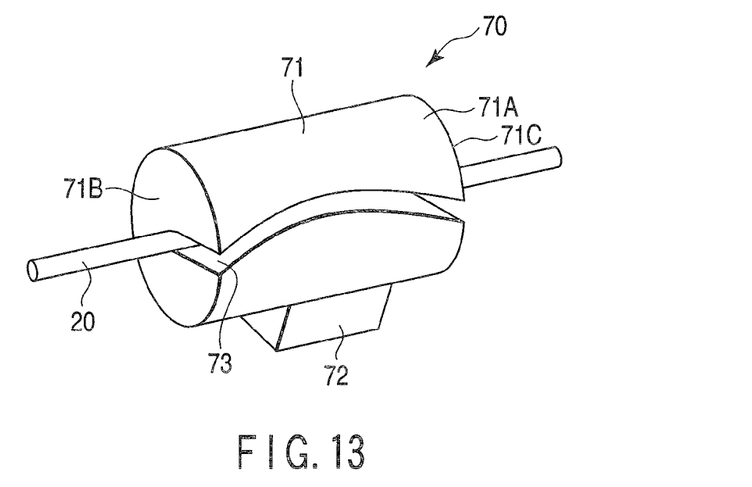
FIG. 13 is a perspective view showing the structure of a tension detection mechanism according to the first modification of the first embodiment.

FIG. 13 is a view showing the structure of a tension detection mechanism 70 according to the first modification. As shown in FIG. 13, the tension detection mechanism 70 includes a cylindrical restraining member 71 which restrains the wire 20 and a strain gauge 72 as a detection member mounted on the restraining member 71. In this case, the restraining member 71 includes a first surface 71A which is a side surface parallel to the longitudinal direction of the restraining member 71 and surfaces perpendicular to the longitudinal direction as second and third surfaces 71B and 71C.

An arcuated groove 73 as a restraining portion is formed in the first surface 71A of the restraining member 71 throughout the total length of the first surface in the longitudinal direction. The wire 20 extends through the groove 73. The groove 73 restrains the movement of the wire 20 in the longitudinal direction partially. The groove 73 as a restraining portion is formed in an arcuated shape which is a nonlinear shape deviating from a straight line connecting the second surface 71B and the third surface 71C (the two ends of the restraining member 71 in the longitudinal direction). For this reason, the length of a portion of the wire 20 restrained by the groove 73 as a restraining portion is larger than the distance between the second surface 71B and third surface 71C of the restraining member 71. That is, the length of the portion of the wire 20 restrained by the groove 73 as a restraining portion is larger than the distance between the two ends of the restraining member 71 in the longitudinal direction.

The strain gauge 72 is mounted on the first surface 71A of the restraining member 71. The strain gauge 72 is placed at a position separated from the portion of the first surface 71A in which the groove 73 is formed by almost 90° in the circumferential direction. With this structure, the strain gauge 72 is mounted on a surface perpendicular to the strain direction of the restraining member 71.

The restraining member 71 of the tension detection mechanism 70 according to this modification is formed in a cylindrical shape. For this reason, when the tension detection mechanisms 70 are provided for the plurality of wires 20, it is possible to achieve space saving by the tension detection mechanisms 70.

The second modification of the first embodiment of the present invention will be described next with reference to FIGS. 14 and 15. In the second modification, the structure of the first embodiment is modified in the following manner. Note that the same reference numerals as in the first embodiment denote the same parts in the second modification, and a repetitive description will be omitted.

Figure 14:
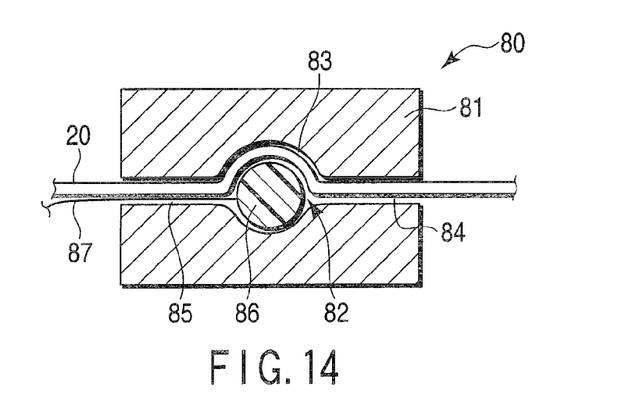
FIG. 14 is a sectional view showing the structure of a tension detection mechanism according to the second modification of the first embodiment.

FIG. 14 is a view showing the structure of a tension detection mechanism 80 according to the second modification. As shown in FIG. 14, the tension detection mechanism 80 includes a rectangular parallelepiped restraining member 81. The restraining member 81 is provided with a restraining portion 82 obtained by, for example, forming a groove in one of the four surfaces of the restraining member 81 which are parallel to the longitudinal direction throughout the total length of the restraining member 81 in the longitudinal direction. As in the case of the tension detection mechanism 13, the restraining portion 82 restrains the wire 20 as a linear member partially.

The restraining portion 82 includes a cavity portion 83 formed in a middle portion in the longitudinal direction, and a distal end side guide portion 84 and a proximal end side guide portion 85 respectively formed on the distal end side and proximal end side of the cavity portion 83. A ball 86 made of a resin as a detection member is mounted in the cavity portion 83. In the cavity portion 83, the wire 20 is placed along the shape of the ball 86, and can move in the direction toward the ball 86. An optical fiber 87 is connected to the ball 86. The optical fiber 87 is connected to a light source device (not shown) outside the manipulator 1 through the proximal end side guide portion 85.

Figure 15:
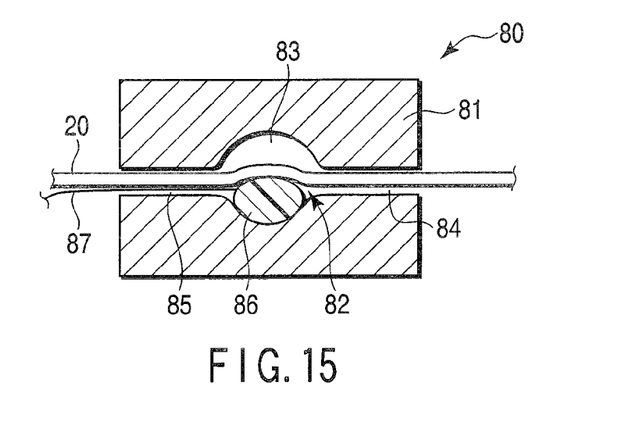
FIG. 15 is a view for explaining the function of the tension detection mechanism according to the second modification of the first embodiment.

With this structure, when tension is produced in the wire 20, the wire 20 moves in the direction toward the ball 86, as shown in FIG. 15. In this case, the ball 86 is deformed upon receiving power from the wire 20. As the ball 86 is deformed, the amount of light which enters the ball 86 through the optical fiber 87 and is reflected to the optical fiber 87 changes. The tension of the wire 20 is detected by detecting a change in the reflection amount of light.

As exemplified by the second modification described above, the detection member of the tension detection mechanism of this embodiment is not limited to the strain gauge mounted on a side surface of the restraining member.

The second embodiment of the present invention will be described next with reference to FIG. 16. In the second embodiment, the structure of the first embodiment is modified in the following manner. Note that the same reference numerals as in the first embodiment denote the same parts in the second embodiment, and a repetitive description will be omitted.

Figure 16:
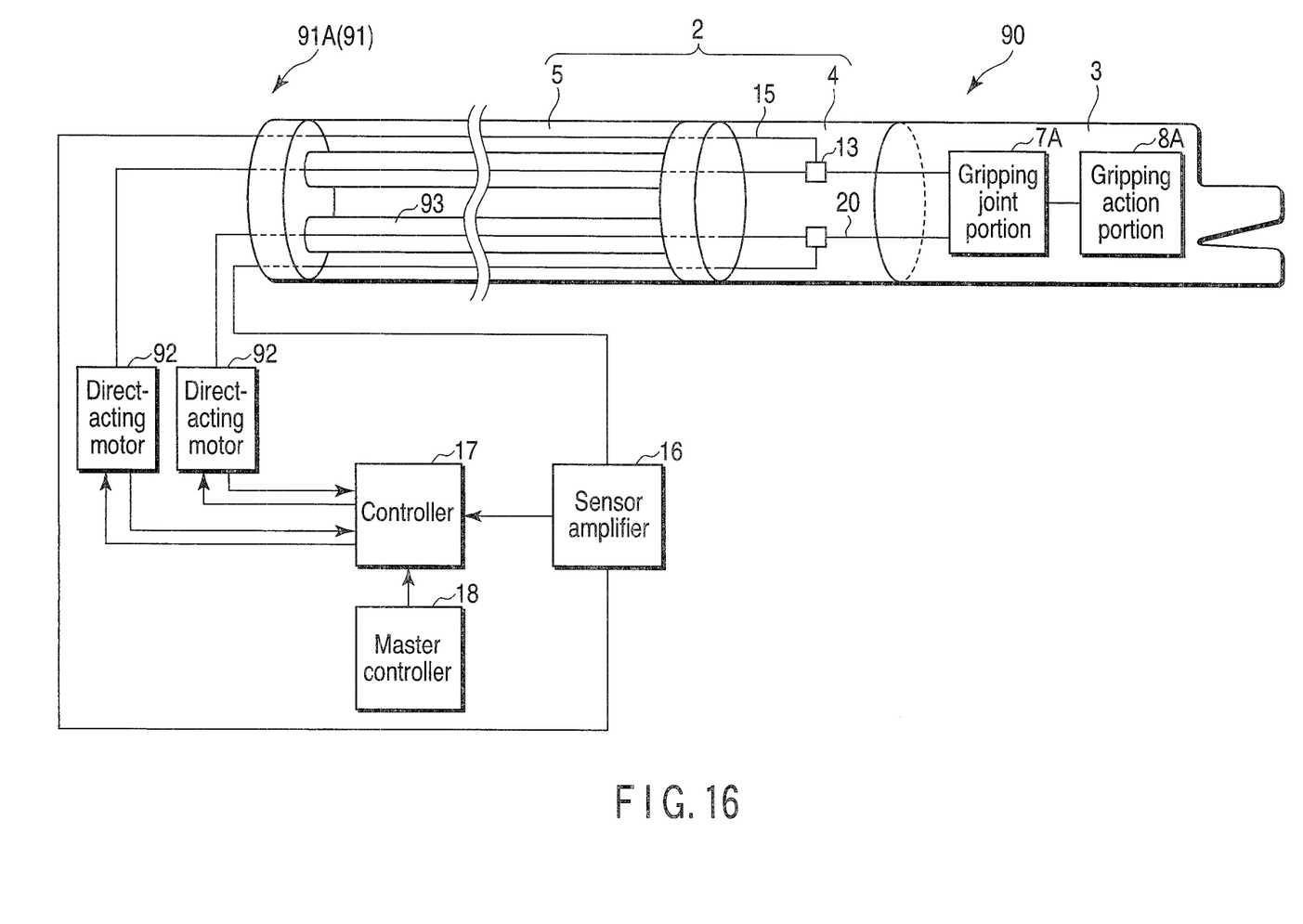
FIG. 16 is a schematic view showing the structure of a gripping drive device according to the second embodiment of the present invention.

FIG. 16 is a view showing a gripping drive device 91A which performs gripping action using a gripping action portion 8A of a manipulator 90 according to this embodiment. As shown in FIG. 16, the gripping drive device 91A includes the gripping action portion 8A which performs gripping action and a gripping joint portion 7A connected to the gripping action portion 8A. Two wires 20 as linear members provided inside a hard portion 4 are connected to the gripping joint portion 7A. The proximal end portion of each wire 20 extends through the flexible portion 5 and is connected to a direct-acting motor 92 as a drive mechanism provided outside the manipulator 90. Driving the direct-acting motor 92 will push the wire 20 toward the distal end side or pull the wire toward the proximal end side, thus moving it in the longitudinal direction. As the wire 20 moves in the longitudinal direction, the gripping joint portion 7A is driven to make the gripping action portion 8A perform gripping action.

A tension detection mechanism 13 configured to detect the tension of each wire 20 is provided near the connecting portion at which the wires 20 are connected to the joint portion 7A as in the first embodiment. Each tension detection mechanism 13 is connected to a sensor amplifier 16 such as a strain amplifier via a signal line 15. A controller 17 as a control mechanism receives the tension information of each wire 20 from the sensor amplifier 16. In addition, the controller 17 receives, from the direct-acting motor 92, position information indicating the moving amount of each wire 20 in the longitudinal direction. Performing operation using a master controller 18 as an operation mechanism based on the tension information and position information input to the controller 17 will drive/control the direct-acting motor 92. This adjusts the tension of each wire 20 and its moving amount in the longitudinal direction.

A portion of each wire 20 which is placed inside a flexible portion 5 is housed in a tubular coil pipe 93. The coil pipe 93 is supported while its distal end portion and proximal end portion are respectively fixed to a distal end side wall portion 50 and a proximal end side wall portion 60. With this structure, the wire 20 can move inside the coil pipe 93 in the longitudinal direction. In addition, when the flexible portion 5 bends, the wire 20 deflects together with the coil pipe 93.

Note that the rotating drive device and the bending drive device which are respectively make a rotating action portion 8B and a bending action portion 8C perform rotating and bending actions have the same structure as that of the gripping drive device 91A. The two wires 20 are therefore connected to each of the joint portion 7A and joint portions 7B and 7C. That is, the six wires 20 are provided inside the hard portion 4 and flexible portion 5 of a tubular portion 2.

In the manipulator 90 of this embodiment, since the wires 20 are arranged inside the flexible portion 5, when the flexible portion 5 bends, the tension distribution from the proximal end to the distal end of each wire 20 is not uniform. However, since the tension detection mechanism 13 is provided near the connecting portion at which each wire 20 is connected to a pulley 23, even when the flexible portion 5 bends, it is possible to detect the tension of the wire 20 near the pulley 23.

The tension detection mechanisms 13 having the above structure and the manipulator 90 using them have the following effects. That is, in the manipulator 90 according to this embodiment, the wires 20 as linear members are restrained by grooves 42 as restraining portions of restraining members 40 of the tension detection mechanisms 13 partially. In this case, since a length L0 of the portion of each wire 20 restrained by the groove 42 as a restraining portion becomes larger than a distance S0 between the two ends of each restraining member 40 in the longitudinal direction, the tension produced in the wire 20 acts on the restraining member 40 to strain it. A strain gauge 41 detects this strain amount to detect the tension of the wire 20. Since there is no need to provide any pulleys for the detection of the tensions of the wires 20 as in the prior art, the miniaturization of the tension detection mechanisms 13 can be implemented. This makes it possible to house the tension detection mechanisms 13 in the small-diameter tube of the manipulator 90.

In addition, the manipulator 90 is provided with the tension detection mechanisms 13 near the connecting portions at which the wires 20 are connected to the pulley 23 as a joint portion. This makes it possible to detect the tensions of the wires 20 near the pulley 23 even when the flexible portion 5 bends. This can accurately detect the force of the pulley 23 and improve the contrability of the pulley 23.

Although the above embodiments have exemplified the case in which the tension detection mechanisms 13 are used for the soft or semi-soft manipulator, it is possible to use the tension detection mechanisms for a hard manipulator with the tubular portion 2 having rigidity. In addition, it is possible to use the tension detection mechanisms 13 for the detection of the tensions of linear members in any apparatus including a drive device which drives a joint portion with the tension of the linear member such as a curving portion of an endoscope.

Additional advantages and modifications will readily occur to those skilled in the art. Therefore, the invention in its broader aspects is not limited to the specific details and representative embodiments shown and described herein. Accordingly, various modifications may be made without depart from the spirit or scope of the general inventive concept as defined by the appended claims and their equivalents.

What is claimed is:

1. A tension detection mechanism comprising:
 a linear member which extends in a longitudinal direction, and which is configured to transmit power;
 a restraining member including a restraining portion through which the linear member extends and which is configured to restrain movement of the linear member in the longitudinal direction partially; and
 a detection member which is provided to the restraining member and which is configured to detect tension of the linear member,
 wherein a length of a portion of the linear member restrained by the restraining portion is larger than a distance between two ends of the restraining member in the longitudinal direction of the linear member,
 the restraining portion includes a hole which extends through the two ends of the restraining member in the longitudinal direction and through which the linear member extends, and
 the hole is formed in a nonlinear shape deviating from a straight line connecting the two ends of the restraining member in the longitudinal direction.

2. The mechanism according to claim 1, wherein the hole is formed in an arcuated shape.

3. The mechanism according to claim 1, wherein the detection member is provided on a side surface of the restraining member which is parallel to the longitudinal direction and perpendicular to a direction in which the restraining member is strained when the tension of the linear member acts on the restraining member.

4. The mechanism according to claim 1, wherein the restraining member is formed in a cylindrical shape.

5. A manipulator comprising:
 a elongated tubular portion;
 a drive mechanism including a drive portion;
 a linear member which is extended in a longitudinal direction inside the tubular portion and has one end portion connected to the drive portion;
 a joint portion which is provided on a distal end side of the tubular portion, to which the other end portion of the linear member is connected, and which is configured to be driven by tension of the linear member; and
 a tension detection mechanism which comprises a restraining member including a restraining portion through which the linear member extends and which is configured to restrain movement of the linear member in the longitudinal direction partially, and a detection member which is provided to the restraining member and which is configured to detect the tension of the linear member,
 wherein a length of a part of the linear member restrained by the restraining portion is larger than a distance between two ends of the restraining member in the longitudinal direction of the linear member.

6. The manipulator according to claim 5, wherein the restraining portion comprises a groove which is formed in a side surface of the restraining member which is parallel to the longitudinal direction, and in which the linear member is inserted, and the groove is formed in a nonlinear shape deviating from a straight line connecting the two ends of the restraining member in the longitudinal direction.

7. The manipulator according to claim 6, wherein the groove is formed in an arcuated shape.

8. The manipulator according to claim 6, wherein the detection member is provided on a side surface of the restraining member which is parallel to the longitudinal direction and perpendicular to a side surface in which the groove is formed.

9. The manipulator according to claim 5, wherein the restraining portion comprises a hole which extends through the two ends of the restraining member in the longitudinal direction and through which the linear member extends, and the hole is formed in a nonlinear shape deviating from a straight line connecting the two ends of the restraining member in the longitudinal direction.

10. The manipulator according to claim 9, wherein the hole is formed in an arcuated shape.

11. The manipulator according to claim 5, wherein the detection member is provided on a side surface of the restraining member which is parallel to the longitudinal direction and perpendicular to a direction in which the restraining member is strained when the tension of the linear member acts on the restraining member.

12. The manipulator according to claim 5, wherein the restraining member is formed in a cylindrical shape.

13. The manipulator according to claim 5, wherein the tubular portion comprising a flexible portion having flexibility.

14. The manipulator according to claim 5, wherein the tension detection mechanism is provided near a connecting portion at which the linear member is connected to the joint portion.

* * * * *